United States Patent
Fang et al.

(10) Patent No.: US 8,103,138 B2
(45) Date of Patent: Jan. 24, 2012

(54) TUNABLE FILTER

(75) Inventors: Yang Fang, Shenzhen (CN); Bin Chen, Shenzhen (CN); Chuan Zhang, Shenzhen (CN); Hong Xie, Shenzhen (CN)

(73) Assignee: O-Net Communications (Shenzhen) Limited, Shenzhen (CN)

( * ) Notice: Subject to any disclaimer, the term of this patent is extended or adjusted under 35 U.S.C. 154(b) by 203 days.

(21) Appl. No.: 12/688,166

(22) Filed: Jan. 15, 2010

(65) Prior Publication Data

US 2011/0096399 A1    Apr. 28, 2011

(30) Foreign Application Priority Data

Oct. 23, 2009    (CN) .......................... 2009 2 0206309

(51) Int. Cl.
*G02B 6/26* (2006.01)
*G02B 5/18* (2006.01)
*H04J 14/02* (2006.01)

(52) U.S. Cl. ................. 385/18; 385/14; 385/15; 385/19; 385/24; 385/27; 385/37; 359/566; 359/563; 359/572; 359/578; 359/579; 398/82; 398/83; 398/84; 398/85; 398/86; 398/88; 398/89

(58) Field of Classification Search ............... 385/14–15, 385/18–19, 24, 27, 37; 398/82–88; 359/563, 359/566, 572, 578–579
See application file for complete search history.

(56) References Cited

U.S. PATENT DOCUMENTS

| 6,285,504 | B1* | 9/2001 | Diemeer ........................ 359/578 |
| 6,535,257 | B2* | 3/2003 | Miller ............................ 349/113 |
| 6,718,086 | B1* | 4/2004 | Ford et al. ........................ 385/27 |
| 6,760,511 | B2* | 7/2004 | Garrett et al. ................... 385/24 |
| 6,891,676 | B2* | 5/2005 | Ford et al. ..................... 359/572 |
| 6,941,073 | B2* | 9/2005 | McGuire ......................... 398/84 |
| 7,177,493 | B2* | 2/2007 | McGuire, Jr. ................... 385/16 |
| 2002/0176659 | A1* | 11/2002 | Lei et al. ........................ 385/24 |
| 2004/0008928 | A1* | 1/2004 | Gerken et al. .................. 385/24 |
| 2004/0013356 | A1* | 1/2004 | Wang et al. .................... 385/27 |
| 2005/0074204 | A1* | 4/2005 | Wilson et al. .................. 385/24 |
| 2005/0094934 | A1* | 5/2005 | He et al. ........................ 385/24 |
| 2008/0175280 | A1* | 7/2008 | Bouma et al. .................. 372/20 |

* cited by examiner

*Primary Examiner* — Brian M. Healy
*Assistant Examiner* — Guy Anderson

(57) ABSTRACT

A tunable filter is provided. The tunable filter comprises an input optical fiber for launching an optical signal into the tunable filter; a collimator disposed for collimating light transmitted from the input optical fiber; a grating disposed for dispersing the collimated light according to wavelength in a dispersion plane; a first reflector disposed for reflecting at least a portion of the dispersed light to a second reflector; a second reflector disposed for reflecting the dispersed light back to the grating; a third reflector disposed for reflecting the transmitted dispersed light from the grating back to the grating, wherein then the second reflector reflects the transmitted dispersed light to the first reflector, the first reflector reflects the transmitted dispersed light back to the grating, the collimator receives the transmitted dispersed light from the grating and substantially focusing it to a focal point; and an output optical fiber disposed at the focal point for receiving the focused light; wherein one of the reflectors is rotated to selectively reflect the dispersed light having a predetermined wavelength.

16 Claims, 3 Drawing Sheets

TUNABLE FILTER

FIELD OF THE INVENTION

The present invention relates to a tunable filter, and particularly to a tunable filter with a small size.

BACKGROUND OF THE INVENTION

Optical filter is generally used to select wavelength. The optical filter can be used to select lightwave with required wavelength from lightwave with a variety of wavelength. The optical filter is becoming more and more important in fiber optic communication systems.

Optical filters have many applications in wavelength division multiplexing (WDM) systems, including but not limited to optical spectrum analysis, laser testing, wavelength demultiplexing, and amplified spontaneous emission filtering. Traditionally, optical filters have been based on fibre Bragg gratings (FBGs), thin film dielectric interference filters, Fabry-Perot filters, phased array waveguides, and diffraction gratings. The ideal optical filter is usually associated with flat channel passbands, low insertion loss, high isolation, low cost, high reliability and field ruggedness, high thermal stability, and good filter roll-off characteristics. Furthermore, in many instances it is preferable that the filter is tunable.

Referring to FIG. 3, a tunable filter 10 used in optical signals having a wavelength of 100 GHZ ITU is provided. The tunable filter 10 includes an input optical fiber 113, an output optical fiber 111, a collimating/focusing element 13, a grating 15, and a reflector 17. Optical signal transmitted from the input optical fiber 113 passes through the focusing element 13 and is changed into parallel optical signal, which incidents on the grating 15 and be diffracted by the grating 15. Then the optical signal incidents on the reflector 17 and be reflected by the reflector 17 and returns in original path. Lastly, the optical signal is input into the output optical fiber 111. The optical signal is input via the input optical fiber 113 and lastly enters into the output optical fiber 111 by rotating the grating 15 or the reflector 17, The grating 15 is rotatable, so as to change the angle of incidence, and thus change the wavelengths that are filtered However, a tunable filter used in optical signals having a wavelength of 50 GHZ ITU adopts the same optical path as that of a tunable filter 10 used in optical signals having a wavelength of 100 GHZ ITU, which results in using lens with larger diameter. In addition, the filter will have a larger size on the reflector, and therefore it is required to using reflector with larger diameter. Facular having a larger size will result in larger size grating. Therefore, the size of the filter became larger, which will decrease the general using of the filter. Moreover, the total cost of the filter will be increased.

Therefore, it is an object of the instant invention to provide an a tunable filter to overcome the above-described shortcoming.

SUMMARY OF THE INVENTION

It is therefore an object of the present invention to provide a tunable filter and In one aspect, a tunable filter is provided. The tunable filter comprises an input optical fiber for launching an optical signal into the tunable filter; a collimator disposed for collimating light transmitted from the input optical fiber; a grating disposed for dispersing the collimated light according to wavelength in a dispersion plane; a first reflector disposed for reflecting at least a portion of the dispersed light to a second reflector; a second reflector disposed for reflecting the dispersed light back to the grating; a third reflector disposed for reflecting the transmitted dispersed light from the grating back to the grating, wherein then the second reflector reflects the transmitted dispersed light to the first reflector, the first reflector reflects the transmitted dispersed light back to the grating, the collimator receives the transmitted dispersed light from the grating and substantially focusing it to a focal point; and an output optical fiber disposed at the focal point for receiving the focused light; wherein one of the reflectors is rotated to selectively reflect the dispersed light having a predetermined wavelength.

In another aspect, a tunable filter is provided. The tunable filter comprises a fiber tube for supporting an input optical fibre and an output optical fibre; a focusing member having an optical axis, the focusing member being disposed such that a focal point of the focusing member is substantially located at at least one of the input and output optical fibres; a grating disposed for receiving light from the lens and for dispersing it in a dispersion plane; a first reflector disposed for reflecting at least a portion of the dispersed light to a second reflector; a second reflector disposed for reflecting the dispersed light back to the grating; and a third reflector disposed for reflecting the transmitted dispersed light from the grating back to the grating, wherein then the second reflector reflecting the transmitted dispersed light to the first reflector, the first reflector reflecting the transmitted dispersed light back to the grating; and an output optical fibre disposed at the focal point for receiving a focused light from the focusing member; wherein the first reflector is rotated to selectively reflect the dispersion light having a predetermined wavelength.

The present tunable filter has a small size. The manufacturing cost is greatly decreased.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The tunable filter will be described in detail with the following FIG. S and embodiments. It is understood that the following detailed embodiments are used to explain the present invention, and not limited the present invention.

Figure 1:
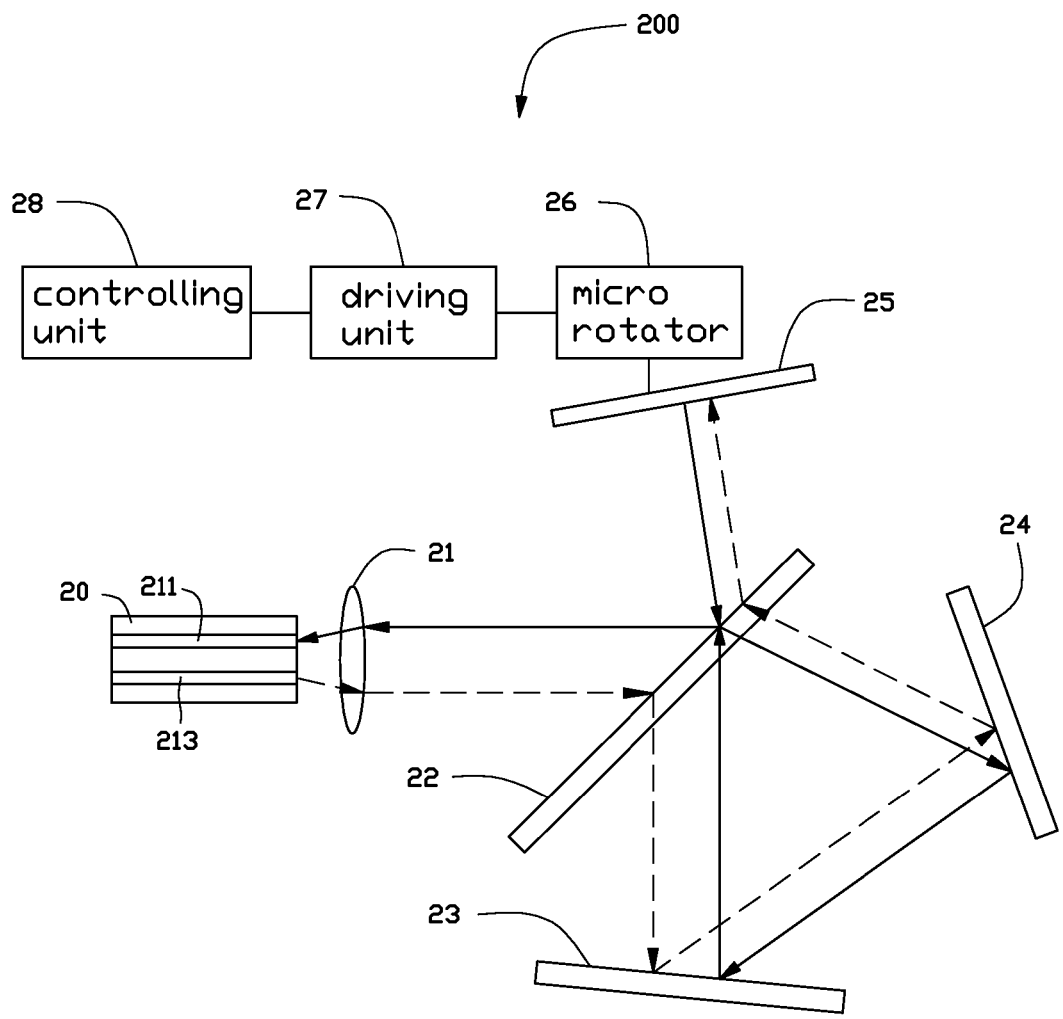
FIG. 1 is a perspective, schematic view of a tunable filter according to a first embodiment according to the present invention.

Referring to FIG. 1, a tunable filter 200 according to a first embodiment of the present invention is provided. The tunable filter 200 includes a double-fiber 20, a collimator or focusing member 21, a grating 22, a first reflector 23, a second reflector 24, and a third reflector 25. The third reflector 25 is controlled by a micro rotator 26. The micro rotator 26 is connected with a driving unit 27 and a controlling unit 28 in series.

The double fiber 20 includes an input optical fiber 213, and an output optical fiber 211. The input optical fiber 213 is used to input optical signal having a wavelength of 50 GHZ ITU. The input optical fiber 213 and the output optical fiber 211 are disposed parallel to each other. The output optical fiber 211 is used to receive a required signal. In this embodiment, the distance between the input optical fiber 213 and the output optical fiber 211 is adjustable. The distance between the input optical fiber 213 and the output optical fiber 211 is 125 μm. It is understood that the filter may further comprises a fiber tube for supporting the input and output optical fibres. Also, the fiber tube comprises an end face that is angled to reduce back reflection.

The collimator 21 is a lens group. The collimator 21 is used to convert the input optical signal into parallel optical signal and focalize parallel optical signal to the core of the fiber in the output optical fiber 211. The grating 22 is a transmission-type grating, and used to diffract optical signal.

The third reflector 25 is used to choose a appropriate angle to select a required optical signal according to a predetermined requirement. The micro rotator 26 is used to control the angle of the reflector 25. The controlling unit 28 is used to input voltage signal to the driving unit 27. The driving unit 27 is used to control the angle of the micro rotator 26 according to the voltage signal.

In using, optical signal from the input optical fiber 213 is converted into parallel optical signal via the collimator 21. The parallel optical signal incidents into the grating 22 and is diffracted by the grating 22 to form a diffracted optical signal. The diffracted optical signal is orderly reflected by the first reflector 23, the second reflector 24, and is secondly diffracted by the grating 22, and incidents on the third reflector 25. The third reflector 25 selectively reflects optical signal having a predetermined wavelength. Then, the optical signal having a predetermined wavelength returns back to the output optical fiber 211 according to original light path. That is, the optical signal having a predetermined wavelength is firstly diffracted by the grating 22, and orderly reflected by the second reflector 24, the first reflector 23, and is secondly diffracted by the grating 22, and lastly enter into the output optical fiber 211. The optical signal passes through the grating 22 four times from the input optical fiber 213 to the output optical fiber 211.

Figure 2:
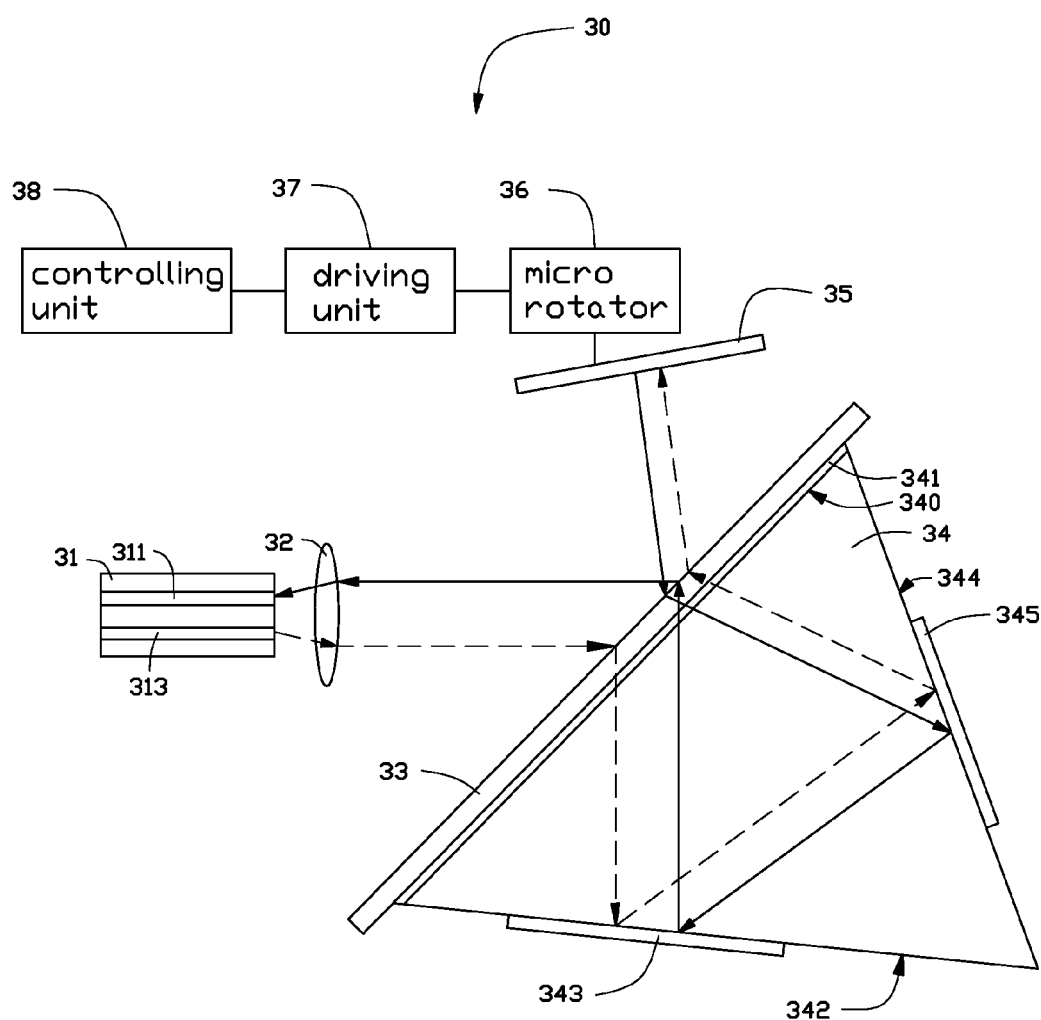
FIG. 2 is a perspective, schematic view of a tunable filter according to a second embodiment according to the present invention.
Figure 3:
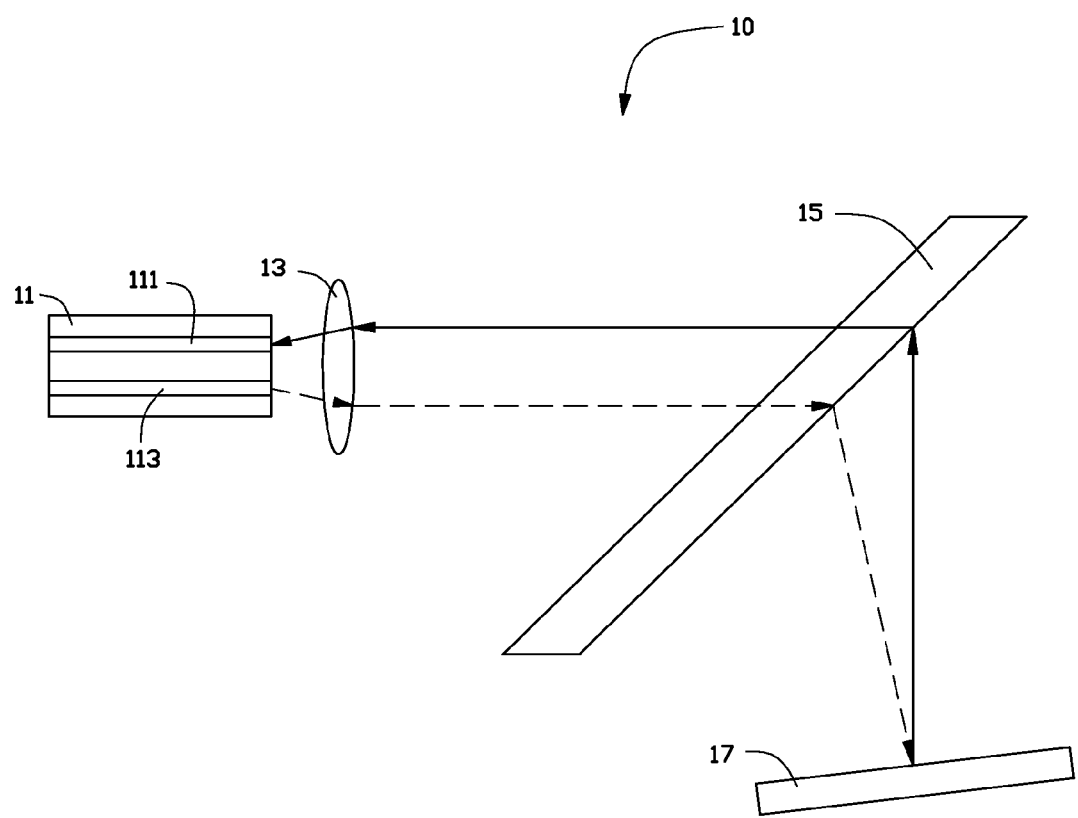
FIG. 3 is perspective, schematic view of a related art.

Referring to FIG. 2, a tunable filter 30 according to a second embodiment of the present invention is provided. The tunable filter 30 includes a double-fiber 31, a collimator 32, a grating 33, a prism 34, and a third reflector 25. The third reflector 25 is controlled by a micro rotator 36. The micro rotator 36 is connected with a driving unit 37, and a controlling unit 38 in series.

The double fiber 31 includes an input optical fiber 313, and an output optical fiber 311. The input optical fiber 313 is used to input optical signal having a wavelength of 50 GHZ ITU. The input optical fiber 313 and the output optical fiber 311 are disposed parallel to each other. The output optical fiber 311 is used to receive a required signal. In this embodiment, the distance between the input optical fiber 313 and the output optical fiber 311 is adjustable. The distance between the input optical fiber 313 and the output optical fiber 311 is 125 μm.

The collimator 32 is a lens group. The collimator 32 is used to convert the input optical signal into parallel optical signal and focalize parallel optical signal to the core of the fiber in the output optical fiber 311. The grating 33 is a transmission-type grating, and used to diffract optical signal.

The prism 34 has a first surface 340, a second surface 342, and a third surface 344. The first surface 340 is coated with antireflection coating 341. The second surface 342 and the third surface 344 are respectively coated with a first high reflective film 343 and a second high-reflective film 345. The first surface 340 with the antireflection coating 341 is parallel to the grating 33. It is understood that the grating 33 can be installed on the first surface 340 of the prism 34.

The third reflector 35 is used to choose a appropriate angle to select a required optical signal according to a predetermined requirement. The micro rotator 36 is used to control the angle of the reflector 35. The controlling unit 38 is used to input voltage signal to the driving unit 37. The driving unit 37 is used to control the angle of the micro rotator 36 according to the voltage signal.

In using, optical signal from the input optical fiber 313 is converted into parallel optical signal via the collimator 32. The parallel optical signal incidents into the grating 22 and is diffracted by the grating 22 to form a diffracted optical signal. The diffracted optical signal passes through the antireflection coating 341 and is orderly reflected by the first high-reflective film 343, the second high-reflective film 345, and again passes through the antireflection coating 341 and is secondly diffracted by the grating 22, and incidents on the third reflector 25. The third reflector 25 selectively reflects optical signal having a predetermined wavelength. Then, the optical signal having a predetermined wavelength returns back to the output optical fiber 311 according to original light path. That is, the optical signal having a predetermined wavelength is firstly diffracted by the grating 33, and orderly reflected by prism 34, and is secondly diffracted by the grating 22, and lastly enter into the output optical fiber 211. The optical signal passes through the grating 33 four times from the input optical fiber 313 to the output optical fiber 311.

The tunable filter according to the present invention has a small size. The manufacturing cost can be greatly decreased.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A tunable filter, comprising: an input optical fiber for launching an optical signal into the tunable filter; a collimator disposed for collimating light transmitted from the input optical fiber; a grating disposed for dispersing the collimated light according to wavelength in a dispersion plane; a first reflector disposed for reflecting at least a portion of the dispersed light to a second reflector; a second reflector disposed for reflecting the dispersed light back to the grating; a third reflector disposed for reflecting the transmitted dispersed light from the grating back to the grating, wherein then the second reflector reflects the transmitted dispersed light to the first reflector, the first reflector reflects the transmitted dispersed light back to the grating, the collimator receives the transmitted dispersed light from the grating and substantially focusing it to a focal point; and an output optical fiber disposed at the focal point for receiving the focused light; wherein one of the reflectors is rotated to selectively reflect the dispersed light having a predetermined wavelength.

2. A tunable filter according to claim 1, wherein the collimator comprises a lens.

3. A tunable filter according to claim 2, further comprising a fiber tube for supporting the input and output optical fibres.

4. A tunable filter according to claim 3, wherein the fiber tube comprises an end face that is angled to reduce back reflection.

5. A tunable filter according to claim 1, further comprising a prism, wherein the first reflector and the second reflector are respectively high-reflective films coated on two surfaces of the prism, the third reflector is rotatable.

6. A tunable filter according to claim 5, wherein the prism has an anti-reflection coating on side parallel to the grating.

7. A tunable filter according to claim 1, wherein the grating is transmission-type grating.

8. A tunable filter according to claim 1, wherein the distance between the input and the output optical fiber is adjustable.

9. A tunable filter according to claim 1, further comprising a micro rotator used to control the rotating angle of the reflector.

10. A tunable filter according to claim 9, further comprising a driving unit and a controlling unit, wherein the controlling unit is used to input voltage signal to the driving unit, the driving unit is used to control the rotating angle of the micro rotator according to the voltage signal.

11. A tunable filter comprising: a fiber tube for supporting an input optical fibre and an output optical fibre; a focusing member having an optical axis, the focusing member being disposed such that a focal point of the focusing member is substantially located at at least one of the input and output optical fibres; a grating disposed for receiving light from the lens and for dispersing it in a dispersion plane; a first reflector disposed for reflecting at least a portion of the dispersed light to a second reflector; a second reflector disposed for reflecting the dispersed light back to the grating; and a third reflector disposed for reflecting the transmitted dispersed light from the grating back to the grating, wherein then the second reflector reflecting the transmitted dispersed light to the first reflector, the first reflector reflecting the transmitted dispersed light back to the grating; and an output optical fibre disposed at the focal point for receiving a focused light from the focusing member; wherein the first reflector is rotated to selectively reflect the dispersion light having a predetermined wavelength.

12. A tunable filter according to claim 11, wherein the collimator comprises a lens.

13. A tunable filter according to claim 11, further comprising a prism, wherein the first reflector and the second reflector are respectively high-reflective films coated on two surfaces of the prism, the third reflector is rotatable.

14. A tunable filter according to claim 13, wherein the prism has an anti-reflection coating on side parallel to the grating.

15. A tunable filter according to claim 11, further comprising a micro rotator used to control the rotating angle of the reflector.

16. A tunable filter according to claim 15, further comprising a driving unit and a controlling unit, wherein the controlling unit is used to input voltage signal to the driving unit, the driving unit is used to control the rotating angle of the micro rotator according to the voltage signal.

* * * * *